United States Patent
Li et al.

(10) Patent No.: US 10,506,282 B2
(45) Date of Patent: Dec. 10, 2019

(54) GENERATING MEDIA SIGNATURE FOR CONTENT DELIVERY

(71) Applicant: SYNAMEDIA LIMITED, Staines Upon Thames (GB)

(72) Inventors: Jian Li, Shanghai (CN); Peter P. Zhu, Cupertino, CA (US); Jigar Shah, San Jose, CA (US); Sarav Ramaswamy, Santa Clara, CA (US); Bhaskar Bhupalam, Fremont, CA (US)

(73) Assignee: SYNAMEDIA LIMITED, Middlesex (GB)

( * ) Notice: Subject to any disclaimer, the term of this patent is extended or adjusted under 35 U.S.C. 154(b) by 715 days.

(21) Appl. No.: 14/058,813

(22) Filed: Oct. 21, 2013

(65) Prior Publication Data

US 2015/0113575 A1  Apr. 23, 2015

(51) Int. Cl.
*H04N 21/435* (2011.01)
*H04N 21/235* (2011.01)
*H04N 21/232* (2011.01)
*H04N 21/278* (2011.01)
*H04N 21/84* (2011.01)
*H04N 21/61* (2011.01)
*H04N 21/858* (2011.01)

(52) U.S. Cl.
CPC ......... *H04N 21/435* (2013.01); *H04N 21/232* (2013.01); *H04N 21/235* (2013.01); *H04N 21/278* (2013.01); *H04N 21/6125* (2013.01); *H04N 21/84* (2013.01); *H04N 21/8586* (2013.01)

(58) Field of Classification Search
CPC .. H04N 21/232; H04N 21/235; H04N 21/278; H04N 21/435; H04N 21/6125; H04N 21/84; H04N 21/8586

USPC ...... 725/31, 92, 97, 110, 131; 709/219, 223, 709/248
See application file for complete search history.

(56) References Cited

U.S. PATENT DOCUMENTS

| 6,115,818 A * | 9/2000 | Barton | G06T 1/0028 348/E7.056 |
| 2003/0163691 A1* | 8/2003 | Johnson | H04L 29/06 713/168 |

(Continued)

FOREIGN PATENT DOCUMENTS

EP  1612686 A1  1/2006

*Primary Examiner* — Fernando Alcon
*Assistant Examiner* — Alan H Luong
(74) *Attorney, Agent, or Firm* — Merchant & Gould P.C.

(57) ABSTRACT

A system includes a content management database configured to access a plurality of media signatures corresponding to a respective plurality of media assets and a signature component configured to process a media request from a requestor to access a given media asset from a content provider via a network and to generate a signature to substantially uniquely identify the given media asset, the signature being derived from media content data corresponding to the given media asset in response to accessing the media content data via the network. The signature component can also be configured to provide to the requestor the given media asset retrieved via the network if the generated media signature does not match any of a plurality of media signatures and provide the given media asset from a content storage system if the generated media signature matches a respective one of the plurality of media signatures.

16 Claims, 3 Drawing Sheets

(56) References Cited

U.S. PATENT DOCUMENTS

| | | | |
|---|---|---|---|
| 2004/0131184 A1* | 7/2004 | Wu | G08B 13/19647 |
| | | | 380/202 |
| 2006/0212531 A1 | 9/2006 | Kikkawa et al. | |
| 2007/0028111 A1* | 2/2007 | Covely | G06F 21/51 |
| | | | 713/176 |
| 2007/0271300 A1* | 11/2007 | Ramaswamy | H04H 60/40 |
| 2007/0300267 A1* | 12/2007 | Griffin | H04L 29/06027 |
| | | | 725/81 |
| 2010/0128918 A1* | 5/2010 | MacWan | H04N 21/63 |
| | | | 382/100 |
| 2011/0131298 A1* | 6/2011 | Courtemanche | H04L 67/1095 |
| | | | 709/219 |
| 2011/0264676 A1* | 10/2011 | Belan | G06F 17/30849 |
| | | | 707/756 |
| 2012/0079527 A1* | 3/2012 | Trimper | H04N 21/2225 |
| | | | 725/31 |
| 2012/0109902 A1 | 5/2012 | Rozensztejn et al. | |
| 2013/0067052 A1* | 3/2013 | Reynolds | H04L 67/02 |
| | | | 709/223 |
| 2013/0120651 A1 | 5/2013 | Perry | |
| 2013/0130686 A1* | 5/2013 | Ikeda | H04W 48/16 |
| | | | 455/435.1 |
| 2013/0291082 A1* | 10/2013 | Giladi | H04L 63/123 |
| | | | 726/7 |
| 2013/0346631 A1* | 12/2013 | Gandhi | H04N 21/4126 |
| | | | 709/248 |
| 2015/0033023 A1* | 1/2015 | Xu | H04L 9/3247 |
| | | | 713/176 |

* cited by examiner

GENERATING MEDIA SIGNATURE FOR CONTENT DELIVERY

TECHNICAL FIELD

This disclosure relates to generating a media signature to facilitate content delivery based on the media signature.

BACKGROUND

In addition to traditional over the air or cable broadcasts, a third party resource can provide broadband delivery of audio and video to one or more users via a network (e.g., the Internet). For instance, a service provider (e.g., an internet service provider (ISP)) can provide a user access to the network via which such user can request and receive the video content from a third party content provider. The requested audio and video data thus can be delivered to the user as Over-The-Top (OTT) content. In the delivery of OTT content, the service provider generally is responsible only for transporting the IP packets that contains the content from the third party content provider.

DESCRIPTION OF EXAMPLE EMBODIMENTS

Overview

Figure 1:
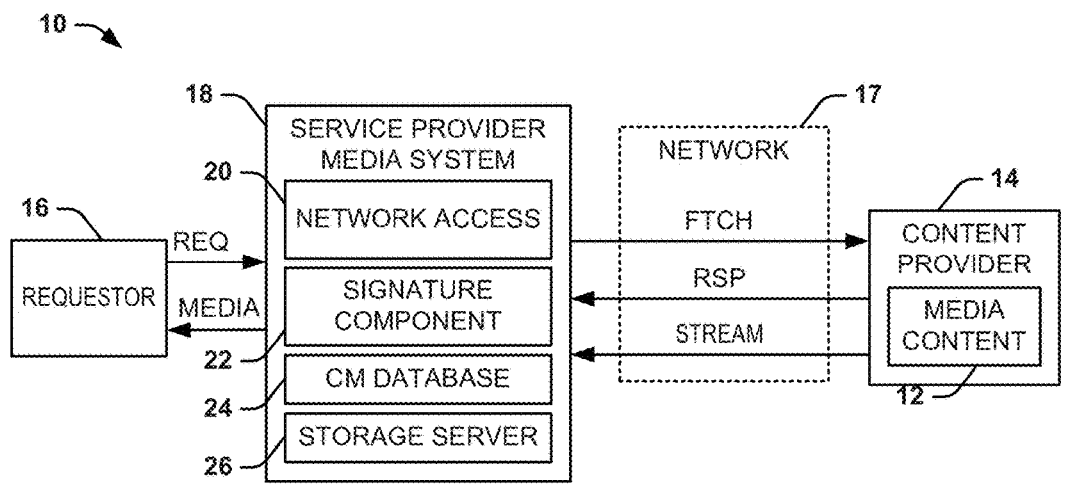
FIG. 1 illustrates an example of a network system.

This disclosure relates to generating a media signature to facilitate content delivery based on the media signature.

One example embodiment includes a system. The system can include a content management database configured to access a plurality of media signatures corresponding to a respective plurality of media assets. The system can also include a signature component configured to process a media content request from a requestor to access a given media asset from a content provider via a network and to generate a media signature to substantially uniquely identify the given media asset, the media signature being derived from media content data corresponding to the given media asset in response to accessing the media content data from the content provider via the network. The signature component can also be configured to provide the given media asset to the requestor retrieved from the content provider via the network if the generated media signature does not match any of a plurality of media signatures and to provide the given media asset to the requestor from a content storage system if the generated media signature matches a respective one of the plurality of media signatures.

Another example embodiment includes a method. The method can include processing a media content request from a requestor and accessing media content corresponding to the media content request from a content provider via a network. The method can also include generating a media signature that substantially uniquely identifies the media content based on a plurality of different parameters derived from the media content that is accessed from the content provider in response to the media content request. The method can also include comparing the generated media signature with a plurality of media signatures stored in a content management database, each of the plurality of media signatures corresponding to a respective one of a plurality of media assets stored in a storage server. The method can also include providing a given one of the plurality of media assets, corresponding to the media content request, to the user in response to the media signature matching a respective one of the plurality of media signatures. The method can also include providing the media content from the content provider to the user via the network in response to the media signature not matching a respective one of the plurality of media signatures. The method can also include storing the media signature in the content management database in response to the media signature not matching the respective one of the plurality of media signatures.

Another example embodiment can include an apparatus. The apparatus can includes a content management database configured to store a plurality of media signatures corresponding to each of a plurality of media assets. A processor can be configured to execute instructions comprising a signature generator configured to generate a media signature that substantially uniquely identifies media content data in response to accessing the media content data from a content provider based on a media content request from a requestor. The media signature can include data specifying a last modified time of the media content data, a content length of the media content data, and an error-detecting code derived from a predetermined number of bytes of the media content data. The instructions can also include a signature comparator configured to compare the generated media signature with the stored plurality of media signatures, and to provide a given one of the plurality of media assets corresponding to the media content request to the requestor in response to the generated media signature matching a respective one of the plurality of media signatures.

Example Embodiments

FIG. 1 illustrates an example of a network system 10. The network system 10 can be implemented for delivering media content 12 that can be hosted at a resource location managed by a content provider 14 to a requestor 16, such as via a computer. As an example, the requestor 16 can be a user of the computer, or it can be the computer itself. As a further example, the requestor 16 can be configured as any of a variety of computer devices that can retrieve and play the media content for consumption by the user. Examples of the computer 16 can include a personal computer (PC), tablet computer, smart-phone, or any of a variety of network-connected media devices (e.g., set top boxes, gaming consoles, digital video recorder (DVR), digital video disc (DVD) player, Blu-Ray player, or any other such device). The media content 12 can include audio content, video content, audio and video content, as well as any other type of information that can digitized and stored in a given format that can be accessible by a requestor.

The content provider 14 can be any of a variety of enterprises that can host the media content 12 on an origin server and that can be implemented as the resource location for the media content that is accessible via a network 17 (e.g., the Internet), such as via a web browser. Additionally, there can be any number of content providers 14 that can provide a plurality of different program offerings as media content 12. For example, each content provider 14 can provide the content as a subscription-based service or it can be provided without requiring a subscription.

The network system 10 also includes a service provider media system 18 that can be associated with a web service provider (e.g., an Internet service provider (ISP)). For example, the service provider media system 18 can be located at a service provider premises or other location to connect subscriber equipment with the network 17, such as the Internet. That is, the service provider that is associated with the service provider media system 18 can provide connectivity of the requestor 16 to the network 17, and thus to the content provider 14. The service provider media system 18 is thus configured to receive a media content request REQ from the requestor 16 and to provide the media content 12 to the requestor 16 via the network 17. As described herein, the service provider media system 18 can create a media signature of the media content 12 and can implement the media signature to provide the media content 12 as a media stream MEDIA to the computer 16 from the content provider 14 (e.g., streaming from the content provider 14 to the requestor 16), or from local storage in the service provider media system 18 itself.

The service provider media system 18 includes a network access system 20, a signature component 22, a content management (CM) database 24, and a storage server 26. The network access system 20 can be implemented by the service provider media system 18 as an interface with the network 17. The network access system 20 is configured to connect the computer and other network-enabled devices to the network 17 by transporting internet protocol (IP) packets between users (e.g., the requestor 16) and the network 17, enabling users to access network services such as including the content provider 14. Thus, the resulting stream of content provided from the content provider 14 can be delivered by the network access system 20 of the network system 10 to the requestor (via a computer) 16 as over the top (OTT) data.

For example, the media content request REQ can be received at the network access system 20 from the requestor 16, and the network access system 20 can send the request on behalf of the requestor to access the media content 12 stored at the content provider 14 via the network 17. In the example of FIG. 1, in response to receiving the media content request REQ, the service provider media system 18 transmits a request FTCH (e.g., as one or more IP packets) to the content provider 14 to access the media content 12. In response, the content provider 14 transmits a response RSP to the service provider media system 18 that includes data associated with the media content 12. As an example, the response RSP can include a response header that includes metadata associated with the media content 12, as well as at least a portion of the media content 12. For example, the response header of the response RSP can be configured as a Hypertext Transfer Protocol (HTTP) response header that includes standard header data, such as including a uniform resource locator (URL) associated with the origin server that stores the media content 12, as well as metadata that describes the media content 12, such as including a content length of the media content 12 and/or a last modified time associated with the media content 12.

The signature component 22, in response to the service provider media system 18 receiving the response RSP, is configured to generate a media signature that substantially uniquely identifies the media content 12. For example, the media signature can be configured as a data string comprising a predetermined number of bytes (e.g., 32 bytes) derived from data in the response RSP. The media signature can identify the media content 12 based on a number of different and distinct parameters associated with the media content 12, such as disclosed herein.

Figure 2:
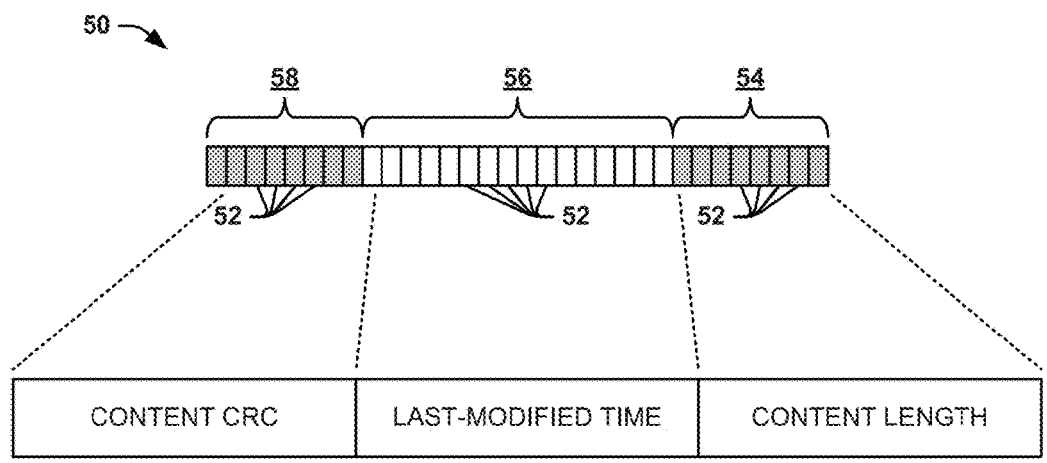
FIG. 2 illustrates an example of a media signature.

FIG. 2 illustrates an example of a media signature 50. The media signature 50 is configured as a string of a plurality of bytes 52, demonstrated in the example of FIG. 2 as 32 bytes, which are arranged in three consecutive portions. The media signature 50 includes a first portion 54 that is associated with a content length of the media content 12. In the example of FIG. 2, the first portion 54 is demonstrated as eight bytes of the media signature 50. The media signature 50 also includes a second portion 56 that is associated with a last modified time of the media content 12. In the example of FIG. 2, the second portion 56 is demonstrated as sixteen bytes of the media signature 50. As an example, the first and second portions 54 and 56 can each be ascertained by the signature component 22 via the response header of the response RSP. The media signature 50 further includes a third portion 58 that can be generated as an error-detecting code. As one example, the third portion 58 can be implemented as a cyclic redundancy check (CRC) string that is derived from a predetermined number of bytes of media data of the media content 12, which can be part of the response RSP and/or provided as packets in the stream of media. In other examples, the third portion 58 can be implemented via other coding functions, such as by implementing a checksum algorithm and/or cryptographic hash function on the response RSP and/or packets from the stream of media.

In the example of FIG. 2, the third portion 58 is demonstrated as eight bytes of the media signature 50. In some examples, the predetermined number of bytes of media data used to generate the CRC string can include the actual encoded media content, as opposed to the response header or media data headers provided as part of the response RSP, such as a predetermined number of bytes of the beginning of the media data of the media content 12, such as standardized by the service provider media system 18 for all items of media content, including the media content 12. For example, the third portion 58 can be generated based on the streaming of at least a portion of the media content 12 from the content provider 14 to the service provider media system 18 in the response RSP, or can be provided via a transfer of the streaming media data corresponding to the media content 12 to the service provider media system 18.

Referring back to the example of FIG. 1, the CM database 24 is configured to store a plurality of media signatures, such as generated at a prior time by the signature component 22. As an example, the plurality of media signatures can each correspond to a respective one of a plurality of media assets (e.g., audio and/or video files) stored in the storage server 26. The media assets stored in the storage server 26 can correspond to a proper subset of media assets selected from the media assets available from the content provider 14. As another example, the plurality of media signatures can each correspond to previous media content requests, such as similar to the media content request REQ, such that the CM database 24 can store statistical information regarding the respective items of media content. The statistical information can include a frequency that a given media asset is requested by a set of subscribers, which can provide an indication of the popularity for the media asset.

Upon generating the media signature, the signature component 22 is configured to compare the media signature that is generated with the plurality of media signatures that are stored in the CM database 24. A match of the media signature with one of the media signatures stored in the CM database 24 can thus indicate that the media content 12 is stored in the storage server 26 (e.g., locally cached in a proxy-cache server). When there is a match, the signature further can be utilized as a key or index to access the requested media content 12 from the storage server 26. In this way, the service provider media system 18 can provide the media content 12 via the media stream directly from the storage server 26 to the requestor 16 instead of streaming of the media content 12 from the content provider 14 via the network 17 to the requestor 16 (e.g., via a media streaming signal STREAM demonstrated in the example of FIG. 1). As a result, the service provider media system 18 may cache only a single copy of the media content 12 in the storage server 26, instead of multiple copies of the media content 12 that are each accessible from different URLs that are employed to access the media content 12 from the content provider 14. In other words, because the media content 12 can be accessed via multiple URLs from the content provider 14, and because the service provider associated with the service provider media system 18 may be unable to identify a correlation between the URLs and the media content 12, the service provider media system 18 can always provide the particular copy of the media content 12 that is specified in the media content request REQ. Furthermore, because the media content 12 may already be cached in the storage server 26, the service provider media system 18 can access and provide the media content 12 in a much more efficient manner than having to establish streaming of the media content 12 from the content provider 14 to the requestor 16 via the network 17.

If the generated media signature does not match one of the media signatures stored in the CM database 24, the service provider media system 18 can be configured to access the media content 12 from the content provider 14 and deliver the media content to the requestor 16 as a media stream, demonstrated in the example of FIG. 1 as the streaming signal STREAM from the content provider 14 to the service provider media system 18 and the streaming signal MEDIA from the service provider media system 18 to the requestor 16.

Additionally, the service provider media system 18 can control storage of the media content 12 in the storage server 26 if it is determined that the generated media signature does not match one of the media signatures in the CM database 24. In some examples, this can be done for each media asset that does not result in a generated media signature matching one of the stored media signatures. In other examples, statistics associated with the media signature, such as might indicate a level of popularity for a given media asset, can be used to trigger storage of a given media asset in the storage server 26. As an example, the IP packets corresponding to the media content 12 can be cached in the storage server 26 as a media file as it is buffered during the streaming of the media content 12 from the content provider 14 to the requestor 16. In addition, the media signature that was created by the signature component 22 can be stored in the CM database 24. As a result, in response to a future media content request for the same media content 12, a media signature can be created by the signature component 22 in response to such request, and that newly created media signature will match the media signature that is saved in the CM database 24. Accordingly, for each request that results in a generated signature matching a stored media signature, the media content 12 that is saved in the storage server 26 can be streamed from the service provider media system 18 to requestor 16, instead of from the content provider 14 to the requestor 16 via the service provider media system 18, as disclosed herein.

Figure 3:
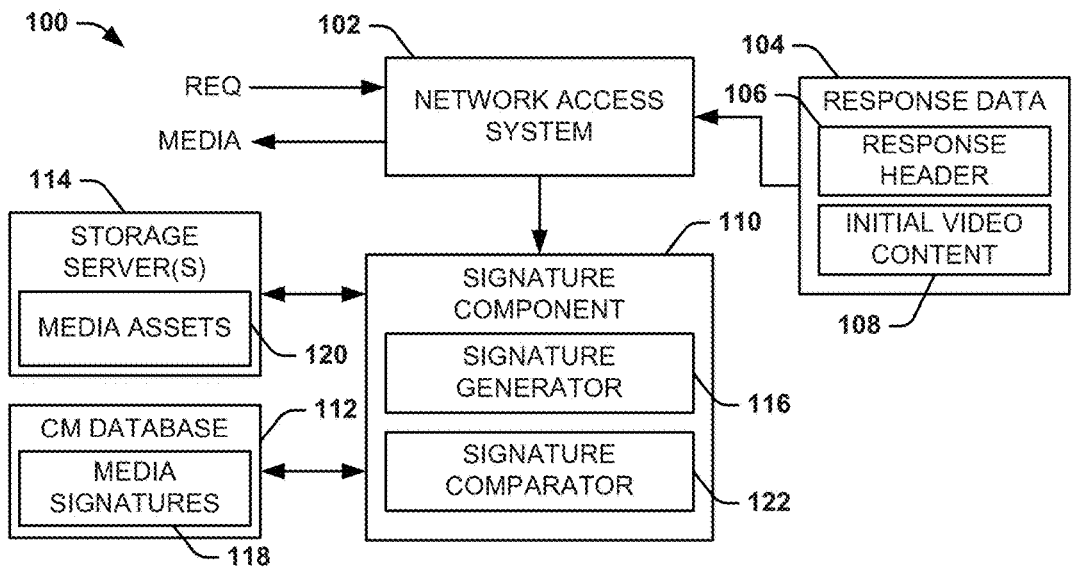
FIG. 3 illustrates an example of a service provider video system.

FIG. 3 illustrates an example of a service provider media system 100. The service provider media system 100 can correspond to the service provider media system 18 in the example of FIG. 1. As an example, the service provider media system 100 can be located at a service provider (e.g., ISP) premises to provide connectivity of a computer (e.g., the requestor 16) to an associated network (e.g., the network 17, such as the Internet), and thus to one or more media content providers (e.g., the content provider 14). Therefore, reference is to be made to the example of FIGS. 1 and 2 in the following description of the example of FIG. 3.

The service provider media system 100 is configured to receive a media content request REQ from a requestor (e.g., the requestor 16 of FIG. 1), such as can be in response to user input or an automated request generated by an application. The service provider media system 100 is further configured to provide a media stream to the computer via an associated network that includes media content corresponding to the media content request REQ. The service provider media system 100 includes a network access system 102 that is implemented by the service provider media system 100 as an interface to provide connectivity between the requestor and the associated network (e.g., network 17 of FIG. 1). Thus, the media content request REQ is received at the network access system 102 and the media stream is provided from the network access system 102 back to the requestor (e.g., as OTT data). The data rate and encoding technology utilized by the In the example of FIG. 3, in response to receiving the media content request REQ, the service provider media system 100 can transmit a request to a content provider (not shown—but see, e.g., content provider 14 of FIG. 1) to access media content from the content provider. In response, the content provider can transmit response data 104 to the service provider media system 100. In the example of FIG. 3, the response data 104 includes a response header 106 and initial media content 108. This may be provided in one or more IP packets, for example. The response header 106 can be configured as an HTTP response header that includes metadata associated with the media content. For example, the response header 106 can include metadata specifying a content length of the media content and a last modified time associated with the media content. Such metadata can be utilized by a signature component 110 to generate a media signature for the media content. In addition, the response header 106 can include additional metadata that is associated with the content provider and the media asset that is being requested. For example, the response header 106 can include an entity tag associated with the content provider, and can include at least one of a host domain name and host URL, such as corresponding to one or more resource location associated with the content provider specifying where the media content is stored. The initial media content 108 in the response data can include a predetermined number of bytes of media content data can include the actual encoded media (e.g., audio and/or video), such as a predetermined number of bytes of the beginning of the media data of the associated media content. The predetermined number of bytes of initial media content 108 can be standardized by the service provider media system 100 for media signature creation, as disclosed herein. For instance, the predetermined number of bytes of initial media content 108 can be a number of bytes that is sufficient for identification of the associated media content (e.g., greater than 500 bytes).

The service provider media system 100 also includes the signature component 110, a CM database 112, and one or more storage servers 114. The signature component 110 includes a signature generator 116 that is configured to generate a media signature based on the response data 104 that is provided in response to the media request REQ. The media signature substantially uniquely identifies the media content corresponding to the media content request REQ. For example, the signature generator 116 can be configured to construct the media signature as disclosed with respect to the media signature 50 in the example of FIG. 2. For instance, the media signature can be a data string comprising a predetermined number of bytes (e.g., 32 bytes) and including a first portion associated with a content length, a second portion associated with a last modified time, and a third portion associated with a CRC of the initial media content 108.

The CM database 112 is configured to store a plurality of media signatures 118. The CM database 112 can also store other content management information and metadata for media assets stored in the storage server 114. The content management information and metadata can include data specifying the time and date each media asset is requested and delivered, data rate and encoding formats used to fulfill each request, data identifying each requestor and statistics associated with the frequency of request for each asset. The media signatures 118 can correspond to media signatures that were generated at a prior time by the signature generator 116 in response to prior media content requests (e.g., similar to the media content request REQ). Each of the one or more storage servers 114 is configured to store a plurality of media assets 120. The storage servers 114 can be co-located (e.g., at a given headend) or be distributed across a network. In some examples, the storage servers 114 can be implemented as a cloud-based storage system. As an example, each of at least a portion of the media signatures 118 can correspond to a respective one of a plurality of media assets 120 stored in the storage server(s) 114. The CM database 112 can store statistical information regarding the respective items of media content, as uniquely identified by the media signatures 118.

In the example of FIG. 3, the signature component 110 also includes a signature comparator 122. Upon the signature generator 116 generating the media signature responsive to a media request REQ, the signature comparator 122 is configured to compare the media signature with the media signatures 118 that are stored in the CM database 112. In addition to comparing media signatures, the signature comparator 122 can also compare other metadata associated with the media content, such as an entity tag associated with the content provider and/or at least one of a host domain name and host URL of the content provider (e.g., as provided in the response header 106). As mentioned above, the other metadata can be stored in the CM database 112 along with the associated media signature and other content management information. Thus, the signature comparator 122 can use the metadata as a further basis for comparison to mitigate false positives in comparison of the created media signature with the stored media signatures 118.

As one example, a match of the media signature (e.g., generated responsive to a request for a given media asset from a specified content provider) with one of the media signatures stored in the CM database 112 can thus indicate that the media content is one of the media assets 120 stored in the storage server(s) 114 (e.g., locally cached in a proxy-cache server). Therefore, the service provider media system 100 can provide the requested media asset 120 to the requestor via the media stream, instead of streaming of the media content from the associated content provider.

As another example, when a match occurs between the generated media signature and one of the media signatures stored in the CM database 112, the signature component 110 can implement an update of statistics stored in the CM database 112 for the requested media content. For example, the statistics can include a popularity statistic associated with a frequency that a given media asset is requested. The popularity statistic can be used by the content provider and/or the service provider media system 100 for a variety of reasons. As an example, the service provider media system 100 can implement proxy-caching of the media content in response to the popularity statistic exceeding a threshold. The popularity threshold can be a multivariate parameter that specifies a frequency, such as a number of times that a given media asset is requested within a moving time window (e.g., days or weeks) evaluated with respect to the current time. The storage server or another component can be configured to remove a respective media asset from the storage server if the statistics indicate that popularity frequency no longer exceeds the threshold. By selectively storing a subset of media assets in the storage server 114 provided that a popularity threshold is exceeded for such assets, the system 100 can include an updated set of media assets 120 having an increased likelihood of being requested by one or more requestors located downstream from the network access system 102.

As a further example, the signature component 110, including the signature generator 116 and the signature comparator 122, can be implemented in a processor (e.g., one or more processor cores) as executable instructions. Such processor can be integrated with the content management database 112 in an apparatus, such as corresponding to a computer or other processor-based appliance (e.g., a digital content manager or other programmable processing equipment), such as may be implemented at a cable headend or similar media content distribution system.

Figure 4:
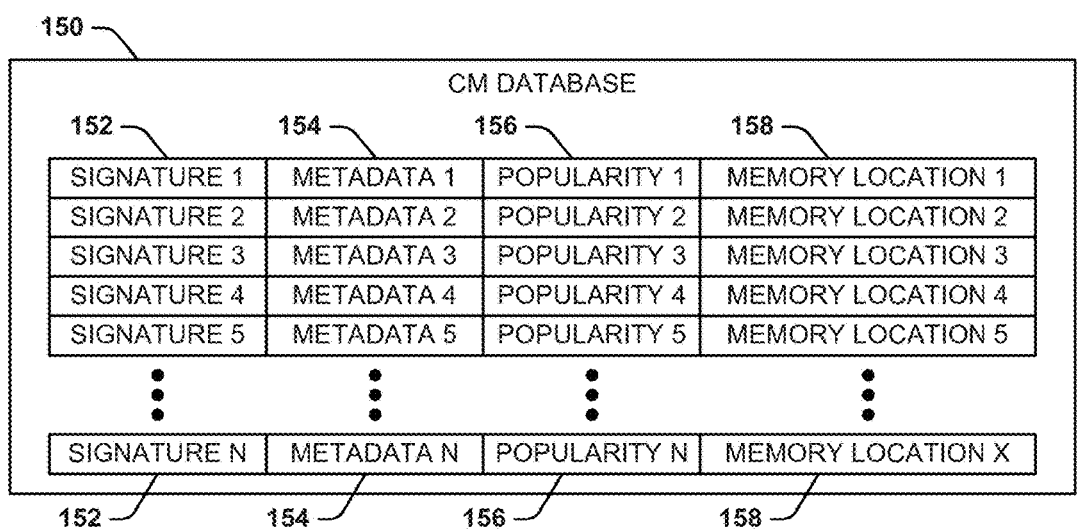
FIG. 4 illustrates an example of a content manager database.

FIG. 4 illustrates an example of a CM database 150. The CM database 150 can correspond to the CM database 112 in the example of FIG. 3. The CM database 150 includes a plurality N of media signatures 152, where N is a positive integer denoting the number of signatures. The media signatures 152 stored in the CM database 150 can each be generated from media content in response to a prior request for media content from one or more content providers. Thus, each of the media signatures 152 can be configured substantially similar to the media signature 50 in the example of FIG. 2 to substantially uniquely identify the associated media asset based on the media content.

For each media signature 152 entry in the CM database 150, the CM database 150 can store an entry for metadata 154 and an entry for a popularity statistic 156 associated with the respective media signature 152. The metadata 154 can include a variety of data associated with the media signature 152, the respective media content, and/or the respective content provider to which the associated media content corresponds. For example, the metadata 154 can include an entity tag associated with the content provider, and/or can include at least one of a host domain name and host URL, such as corresponding to the at least one origin server associated with the content provider on which the media content is stored. The popularity statistic 156 can correspond to a counter that increments each time a given media asset is requested and a corresponding signatures is generated. Additionally or alternatively, the popularity statistic can include time-based statistical information that specifies a frequency or quantity of requests that occur within a predetermined time period (e.g., within a prescribed time window from the current time) for the media asset corresponding to the respective media signature 152.

In addition, the CM database 150 can include a plurality X of entries for memory locations 158 as a pointer to where media assets are stored in the storage server(s) 114, and thus corresponding to the media assets 120 in the example of FIG. 3. As an example, the quantity X can be equal to the quantity N, such that the service provider media system 100 can facilitate storage and retrieval of cached media content from a storage server in response to the comparison of the media signature generated by the signature generator 116 with one of the media signatures 152 stored in the CM database 150. Therefore, the generated media signature and the associated media content are each stored as associated data entries 152 and 158, along with the metadata 154 and the popularity data 156, in the CM database 150.

As another example, the quantity X can be less than the quantity N, such that media assets 120 stored in the server(s) 114 can number less than media signatures 118 in the database 150. As an example, in response to a match of the generated media signature with one of the media signatures 118 in the CM database, the service provider media system 100 can provide the respective one of the media assets 120 to the requesting computer via the media stream MEDIA if the respective memory location entry 158 indicates that the media content is stored as a media asset 120 in the storage server(s) 114. If the memory location entry 158 is empty, or does not indicate that media content is stored as a media asset 120 in the storage server(s) 114, then the CM database 150 can update the popularity statistic 156 to indicate another media content request for the associated media content. The service provider media system 100 can thus facilitate delivery of the media content from the content provider to the associated computer. However, if the popularity statistic 156 for the respective media content increases beyond a predetermined threshold, the CM database 150 can recognize a sufficient demand for the respective media content, such that the service provider media system 100 can trigger storage of the requested media content as a media asset 120 in the storage server(s) 114 based on the popularity of the media content. The CM database 150 can then update the memory location entry 158 to reflect the location of the respective media asset 120 as being cached locally in the storage server(s) 114. As a result, future media content requests for the same media content can result in the service provider media system 100 providing the media content from the storage server(s) 114, instead of from the content provider, as disclosed herein.

Figure 5:
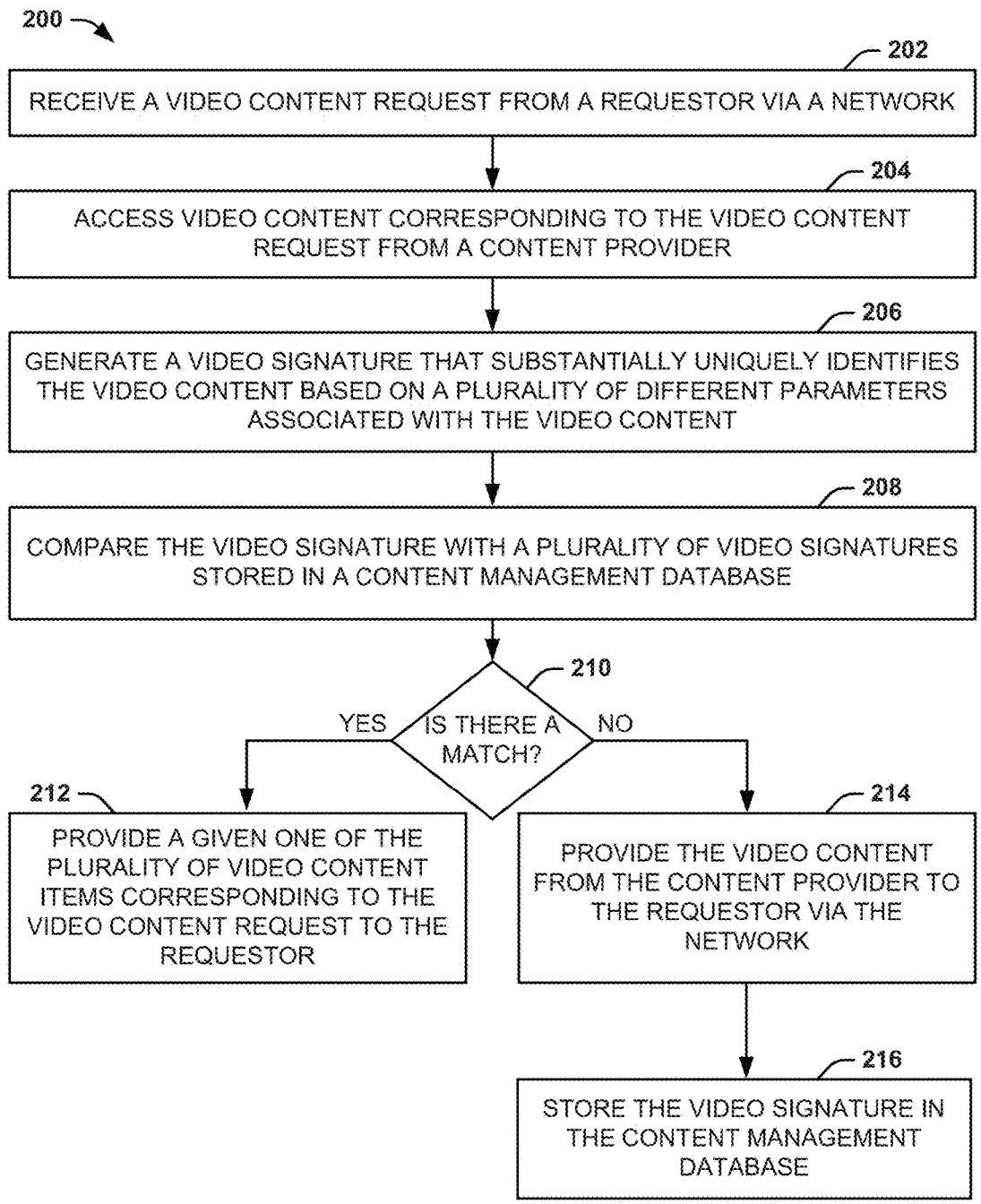
FIG. 5 illustrates an example of a method for providing media content.

In view of the foregoing structural and functional features described above, methods that can be implemented will be better appreciated with reference to FIG. 5. While, for purposes of simplicity of explanation, the methods of FIG. 5 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a method in accordance with an aspect of the present invention. The methods or portions thereof can be implemented as instructions stored in a non-transitory storage medium as well as be executed by a processor of a computer device, for example.

FIG. 5 illustrates an example of a method 200 for providing media content. The method 200 can be implemented by a service provider media system, such as the service provider media system 18 in the example of FIG. 1 or the service provider media system 100 in the example of FIG. 3. At 202, a media content request (e.g., the media content request REQ) is received from a requestor (e.g., requestor 16 of FIG. 1) via a network access system (e.g., system 20 of FIG. 1 or 102 of FIG. 3) configured used to connect the requestor with a network (e.g., the network 17), such as the Internet. The media content request can be initiated via a computer (e.g., the requestor 16) in response to a user input. For example, the media content request can request media content (e.g., the media content 12) from a content provider (e.g., the content provider 14) such as can be configured to provide streaming media as IP packets. At 204, media content corresponding to the media content request is accessed from a content provider. The accessing of the media content can correspond to a response (e.g., the response data 104 of FIG. 3) that is provided by the content provider.

At 206, a media signature (e.g., the media signature 50) is generated (e.g., by signature component 22 of FIG. 1 or 110 of FIG. 3) from media content from the content provider. For instance, the media signature can substantially uniquely identify the media content based on a plurality of different parameters associated with the media content. The media signature can include a first portion derived based on data specifying a content length, a second portion derived based on data specifying a last modified time of the media content, and a third portion derived from a predetermined snippet of media content (e.g., a CRC constructed from an initial predetermined number of bytes of video). At 208, the generated media signature is compared with a plurality of media signatures (e.g., the media signatures 118), such as can be stored in a content management database (e.g., the CM database 24). As disclosed herein, each of the plurality of media signatures can correspond to and uniquely represent a respective one of a plurality of media assets stored in a storage server (e.g., the storage server 26). The comparison can also be based on comparing other related metadata for the requested media content such as an entity tag and/or a domain host or URL associated with the content provider. At 210, it is determined whether there is a match between the media signature and the stored media signatures or not. At 212 ("YES"), a given one of the plurality of media assets corresponding to the media content request is provided to the requestor directly from a locally cached copy. For instance, at 212, the media content can be provided from the storage server directly, as opposed to via the content provider.

The method proceeds from 210 to 214 ("NO") when there is no match between the generated signature and any of the stored signatures. At 214, the media content is provided from the content provider to the requestor via the network in response to the media signature not matching a respective one of the plurality of media signatures. At 216, the media signature is stored in the content management database in response to the media signature not matching the respective one of the plurality of media signatures. The media content can also be stored in the storage server, either automatically or in response to a popularity statistic exceeding a predetermined threshold.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims.

Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, the term "including" means including but not limited to. The term "based on" means based at least in part on.

What is claimed is:

1. A system comprising:
   a content management database configured to access a plurality of media signatures corresponding to a respective plurality of media assets; and
   a signature component configured to:
      process a media content request from a requestor to access a given media asset from a content provider via a network;
      send the processed media content request to the content provider;
      receive a response from the content provider, the response comprising metadata associated with the given media asset in a header and a predetermined number of bytes of the given media asset, the metadata comprising an unified resource locator (URL) of an origin server that stores the media asset, a content length of the given media asset, and a last modified time associated with given media asset;
      generate, from the received response, a media signature to substantially uniquely identify the given media asset, wherein the media signature comprises a data string of a predetermined number of bytes, wherein the data string comprises:
         a first portion derived from data specifying the content length of the given media asset,
         a second portion derived from data specifying the last modified time of the given media asset, and
         a third portion that is generated as an error detecting code derived from the predetermined number of bytes of the beginning of the media content data corresponding to the given media asset,
      perform, in the content management database, a search for the generated media signature, wherein the content management database comprises a plurality of media signatures, a key to access the given media asset from a storage server when cached at the storage server for each of the plurality of media signatures, and statistical information for each of the plurality of media signatures; and
      provide the given media asset to the requestor from the content storage system when the generated media signature matches a respective one of the plurality of media signatures.

2. The system of claim 1, wherein the third portion of the data string is derived from the predetermined number of bytes of the media content data comprising an error-detecting code string.

3. The system of claim 1, wherein, in response to the media signature not matching any of the plurality of media signatures, the signature component is further configured to facilitate delivery of the media content data from the content provider to the requestor and to store the media signature in the content management database as one of the plurality of media signatures.

4. The system of claim 3, further comprising a storage server configured to store a subset of the plurality of media assets, the signature component being configured to store the media content data in the storage server as another one of the plurality of media assets in response to the media signature not matching any of the plurality of media signatures.

5. The system of claim 1, wherein the statistical information comprises a popularity statistics, and wherein the signature component is further configured to update the popularity statistic of one of the plurality of media signatures in the content management database in response to subsequent media content requests for the media content data associated with the respective one of the plurality of media signatures.

6. The system of claim 5, further comprising a storage server configured to store a subset of the plurality of media assets, the signature component being configured to store the media content data in the storage server as another one of the plurality of media assets in response to the popularity statistic exceeding a predetermined threshold.

7. The system of claim 1, wherein the signature component is configured to generate the media signature by accessing the predetermined number of bytes of media content data from the content provider via the network, wherein the media signature comprises data associated with the response header and the predetermined number of bytes of the media content data.

8. The system of claim 7, wherein the signature component is further configured to compare the at least one of the host domain name and the host URL with a stored set of at least one of host domain names and host URLs in addition to comparing the media signature with the stored plurality of media signatures to determine if the media signature matches the respective one of the plurality of media signatures.

9. The system of claim 1, wherein the signature component is configured to save an entity tag provided by the content provider and associated with the content provider in response to accessing the media content data, and
   wherein the signature component is further configured to compare the entity tag with a stored plurality of entity tags in addition to comparing the media signature with the stored plurality of media signatures to determine if the media signature matches the respective one of the plurality of media signatures.

10. A method comprising:
   processing a media request from a requestor to receive a media asset;
   sending the processed media content request to the content provider;
   receiving a response from the content provider, the response comprising metadata associated with the given media asset in a header and a predetermined number of bytes of the given media asset, the metadata comprising an unified resource locator (URL) of an origin server that stores the media asset, a content length of the given media asset, and a last modified time associated with given media asset;
   generating, from the received response, a media signature that substantially uniquely identifies the media asset, wherein the media signature comprises a data string of a predetermined number of bytes, wherein the data string comprises:
      a first portion derived from data specifying the content length of the media asset,
      a second portion derived from data specifying the last modified time of the media asset, and
      a third portion that is generated as an error detecting code derived from the predetermined number of bytes of the beginning of the media content data corresponding to the media asset;

performing, in a content management database, a search for the generated media signature, wherein the content management database comprises a plurality of media signatures stored, a key to access the given media asset from a storage server when cached at the storage server for each of the plurality of media signatures, and statistical information for each of the plurality of media signatures;

providing the media content data from the content provider to the requestor via the network in response to the media signature not matching a respective one of the plurality of media signatures; and storing the media signature in the content management database in response to the media signature not matching the respective one of the plurality of media signatures.

11. The method of claim 10, further comprising enabling storage of the media content data in a storage server as another one of the plurality of stored media assets in response to the media signature not matching any of the plurality of media signatures.

12. The method of claim 11, wherein the enabling storage of the media content data comprises:

updating statistical information of one of the plurality of media signatures in the content management database in response to subsequent media content requests for the media content data associated with the respective one of the plurality of media signatures; and facilitating storage of the media content data in the storage server as another one of the plurality of stored media assets in response to the popularity statistic exceeding a predetermined threshold.

13. The method of claim 10, wherein generating the media signature comprises:

accessing the predetermined number of bytes of the media content data from the content provider; and generating the media signature based on data associated with the response header and the predetermined number of bytes of the media content data.

14. A system comprising:

a memory;

a processor coupled to the memory, wherein the processor is configured to:

process a media request from a requestor to receive a media asset;

send the processed media content request to the content provider;

receive a response from the content provider, the response comprising metadata associated with the given media asset in a header and a predetermined number of bytes of the given media asset, the metadata comprising an unified resource locator (URL) of an origin server that stores the media asset, a content length of the given media asset, and a last modified time associated with given media asset;

generate, from the received response, a media signature that substantially uniquely identifies the media asset, wherein the media signature comprises a data string of a predetermined number of bytes, wherein the data string comprises:

a first portion derived from data specifying the content length of the media asset, a second portion derived from data specifying the last modified time of the media asset, and a third portion that is generated as an error detecting code derived from the predetermined number of bytes of the beginning of the media data corresponding to the media asset, perform, in a content management database, a search for the generated media signature, wherein the content management database comprises a plurality of media signatures stored, a key to access the given media asset from a storage server when cached at the storage server for each of the plurality of media signatures, and statistical information for each of the plurality of media signatures; and provide the media content data from the content provider to the requestor via the network in response to the media signature not matching a respective one of the plurality of media signatures.

15. The system of claim 14, wherein the processor is further configured to store the media signature in the content management database in response to the media signature not matching the respective one of the plurality of media signatures.

16. The system of claim 14, wherein the processor is further configured to enable storage of the media content data in a storage server as another one of the plurality of stored media assets in response to the media signature not matching any of the plurality of media signatures.

* * * * *